(12) United States Patent
Kurihara et al.

(10) Patent No.: US 7,556,413 B2
(45) Date of Patent: Jul. 7, 2009

(54) ILLUMINATION DEVICE AND PROJECTOR

(75) Inventors: Toru Kurihara, Matsumoto (JP); Norio Nakamura, Matsumoto (JP); Makoto Furusawa, Azumino (JP); Hiroki Sakai, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/688,618

(22) Filed: Mar. 20, 2007

(65) Prior Publication Data
US 2007/0223244 A1 Sep. 27, 2007

(30) Foreign Application Priority Data
Mar. 27, 2006 (JP) ............................. 2006-084942

(51) Int. Cl.
*G02B 6/00* (2006.01)
*F21V 9/14* (2006.01)
*H01L 33/00* (2006.01)

(52) U.S. Cl. ...................... 362/560; 362/551; 362/555; 362/19

(58) Field of Classification Search ................ 362/551, 362/555, 560, 241, 301, 302, 304, 346, 297, 362/558, 582, 19, 327, 335, 243, 245, 26, 362/610, 556
See application file for complete search history.

(56) References Cited

U.S. PATENT DOCUMENTS

| | | | | |
|---|---|---|---|---|
| 4,965,488 A | * | 10/1990 | Hihi | ............................ 313/499 |
| 5,723,868 A | * | 3/1998 | Hammond et al. | .......... 250/553 |
| 6,296,376 B1 | * | 10/2001 | Kondo et al. | ................. 362/310 |
| 6,533,427 B2 | * | 3/2003 | Chang | .......................... 362/19 |
| 6,547,416 B2 | * | 4/2003 | Pashley et al. | ............... 362/231 |
| 6,644,841 B2 | * | 11/2003 | Martineau | .................... 362/545 |
| 6,841,804 B1 | * | 1/2005 | Chen et al. | ..................... 257/98 |
| 7,153,015 B2 | * | 12/2006 | Brukilacchio | ................ 362/555 |
| 7,195,386 B2 | * | 3/2007 | Imade | ......................... 362/551 |
| 7,261,441 B2 | * | 8/2007 | Ng et al. | ...................... 362/307 |
| 2006/0262514 A1 | * | 11/2006 | Conner et al. | .................. 362/19 |
| 2007/0019412 A1 | * | 1/2007 | Han et al. | .................... 362/247 |
| 2008/0030691 A1 | | 2/2008 | Godo | |

FOREIGN PATENT DOCUMENTS

| JP | A 2005-140837 | 6/2005 |
|---|---|---|
| JP | A 2005-353816 | 12/2005 |

\* cited by examiner

*Primary Examiner*—Ismael Negron
*Assistant Examiner*—David R Crowe
(74) *Attorney, Agent, or Firm*—Oliff & Berridge, PLC (57) ABSTRACT

An illumination device includes a light source that emits light-source light, a light recovery member that is disposed close to the light source in the vicinity of a lateral side of the light source, and has a light receiving surface inclined at a predetermined angle with respect to an optical axis extending from the light source to the front to face the optical axis or the vicinity of the optical axis, and a rod integrator that uniformizes light-source light from the light source and light-source light reflected by the light recovery member.

18 Claims, 10 Drawing Sheets

ILLUMINATION DEVICE AND PROJECTOR

BACKGROUND

1. Technical Field

The present invention, relates to an illumination device that illuminates a liquid crystal light valve and other light modulation devices, and to a projector having the illumination device.

2. Related Art

As an illumination device that is incorporated into a projector, there is known an illumination device that collects light-source light emitted from a light source unit having an LED or the like forward by a lens or the like so as to be incident on an end of a rod integrator, and uniformly illuminates a liquid crystal light valve by illumination light emitted from the other end of the rod integrator (see JP-A-2005-140837).

In such a projector, light-source light emitted from the light source unit can be comparatively efficiently used, but a light flux emitted from the light source unit laterally cannot efficiently enter the rod integrator. Accordingly, a part of light-source light may be wasted.

SUMMARY

An advantage of some aspects of the invention is that It provides a compact illumination device that can use light-source light with no waste and can irradiate Illumination light with high uniformity, and a projector using the illumination device.

According to an aspect of the invention, an illumination device includes a light source that emits light-source light, a light recovery member that is disposed close to the light source in the vicinity of a lateral side of the light source, and has a light receiving surface inclined at a predetermined angle with respect to an optical axis extending from the light source to the front to face the optical axis or the vicinity of the optical axis, and a rod integrator that uniformizes light-source light from the light source and light-source Light reflected by the light recovery member.

In the above-described illumination device, the light recovery member is disposed close to the light source in the vicinity of the lateral side of the light source and has the light receiving surface inclined at the predetermined angle with respect to the optical axis to face the optical axis or the vicinity of the optical axis. Accordingly, light-source light emitted to the lateral side of the light source can be recovered through the light receiving surface. Then, recovered light is guided to the rod integrator. Therefore, utilization efficiency of light-source light can be increased and illumination light with high uniformity can be obtained. Moreover, the rod integrator is generally disposed on an emission side of the light source or the light recovery member.

In the illumination device according to the aspect of the invention, the light receiving surface of the light recovery member may be a mirror that reflects light-source light to be emitted from the light source. In this case, light-source light emitted to the lateral side of the light source can be emitted to the front side of the light source and guided into the rod integrator.

In the illumination device according to another aspect of the invention, the mirror of the light recovery member may be inclined at approximately 45° with respect to the optical axis. In this case, since light-source light emitted to the lateral side of the light source can be emitted to the front side of the light source, a ratio of illumination light to be emitted to the front can be increased. In addition, reflected light from the light recovery member passes through the rod integrator with a small loss.

In the illumination device according to another aspect of the invention, the light source and the light recovery member may be integrated to form a light source package. In this case, the light source package can have a function of recovering light-source light emitted to the lateral side of the light source and guiding recovered light to the rod integrator on the front side. In addition, assembling of the illumination device can be simplified.

In the illumination device according to another aspect of the invention, the light recovery member may be disposed in the vicinity of a light source package including the light source. In this case, the illumination device can be assembled using a general-use light source package.

In the illumination device according to another aspect of the invention, the light recovery member may be fixed on a pedestal that supports the light source package in this case, the light source package and the light recovery member can be incorporated into the illumination device in a state the light source package and the light recovery member are fixed on the same pedestal.

In the illumination device according to another aspect of the invention, the pedestal and the light recovery member may be integrated to for a pedestal member. In this case, the light recovery member can be aligned with the pedestal in advance. Therefore, mounting accuracy of the light recovery member can be easily increased.

In the illumination device according to another aspect of the invention, the light recovery member may have a fluorescent substance having photosensitivity to light-source light on the light receiving surface or in the vicinity of the light receiving surface. In this case, light-source light emitted to the lateral side of the light source can be converted into fluorescent light. Then, at least a part of fluorescent light can be emitted to the front and guided into the rod integrator.

In the illumination device according to another aspect of the invention, a fluorescent substance provided in the light recovery member may have a light-emission characteristic of at least one of yellow, green, and red light components relative to incident blue light. In this case, the yellow, green, and red light components can be obtained from the light source that generates blue light. Therefore, white light and the like can be emitted from the illumination device as illumination light.

In the illumination device according to another aspect of the invention, the light recovery member may cause a light flux to be emitted by reflection from the light recovery member to be incident on the rod integrator through a rod incident port, and may cause the light flux to be directly emitted from a rod emission port of the rod integrator without being reflected in the rod integrator. In this case, light fluxes to be emitted from the rod incident port to the front can be increased. Therefore, an appropriate illumination of a liquid crystal light valve or the like can be obtained.

In the illumination device according to another aspect of the invention, an aperture, through which a light flux is emitted from the light recovery member, may be smaller than a rod incident port of the rod integrator. In this case, the light flux from the light recovery member can enter the rod integrator with no waste.

In the illumination device according to another aspect of the invention, the aperture of the light recovery member may be disposed inwardly from the rod incident port of the rod integrator. In this case, the light flux from the light recovery member can be directly guided into the rod integrator.

The illumination device according to another aspect of the invention may further include an engagement unit that fixes the aperture of the light recovery member to the rod incident port of the rod integrator. In this case, the rod integrator and the light recovery member can be easily aligned with each other and fixed to each other.

The illumination device according to another aspect of the invention may further include a polarization separating element that is disposed at the back of the rod integrator. In this case, light emitted from the rod integrator can be converted into polarized light in a specific direction by the polarization separating element. Therefore, the liquid crystal light valve and the like can be appropriately illuminated by required polarized light.

In the illumination device according to another aspect of the invention, the polarization separating element may be fixed to a rod emission port of the rod integrator. In this case, the rod integrator and the polarization separating element can be formed in a single body. Therefore, the illumination device can be made compact as a single body.

In the illumination device according to another aspect of the invention, the polarization separating element may be a wire grid polarization element. In this case, the polarization separating element can be reduced in thickness, and polarized light not passing through the polarization separating element can efficiently return to the light source. Therefore, deterioration of the polarization separating element due to heating and the like can be prevented and a possibility of reusing return light can be generated.

In the illumination device according to another aspect of the invention, the rod integrator may have a step portion facing the inside. In this case, light that returns from the rod emission port into the rod integrator can be emitted to the front again to be then utilized.

In the illumination device according to another aspect of the invention, the step portion may be a mirror that turns up return light from the polarization separating element to the rod emission port. In this case, light that returns from the rod emission port into the rod integrator can be reflected to the front again to be then efficiently utilized.

In the illumination device according to another aspect of the invention, the step portion may have a fluorescent substance having photosensitivity to light-source light. In this case, return light to the step portion can be converted into fluorescent light and a part of fluorescent light can be emitted to the front.

According to another aspect of the invention, a projector includes the above-described illumination device, a light modulation device that modulates illumination light from the illumination device according no image information, and a projection optical system that projects image light formed by the light modulation device.

In the above-described projector, the illumination device having the above-described features 1s used. Therefore, a compact projector can be provided at low cost with an illumination device having of a compact and simple structure that can use light-source light with no waste.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
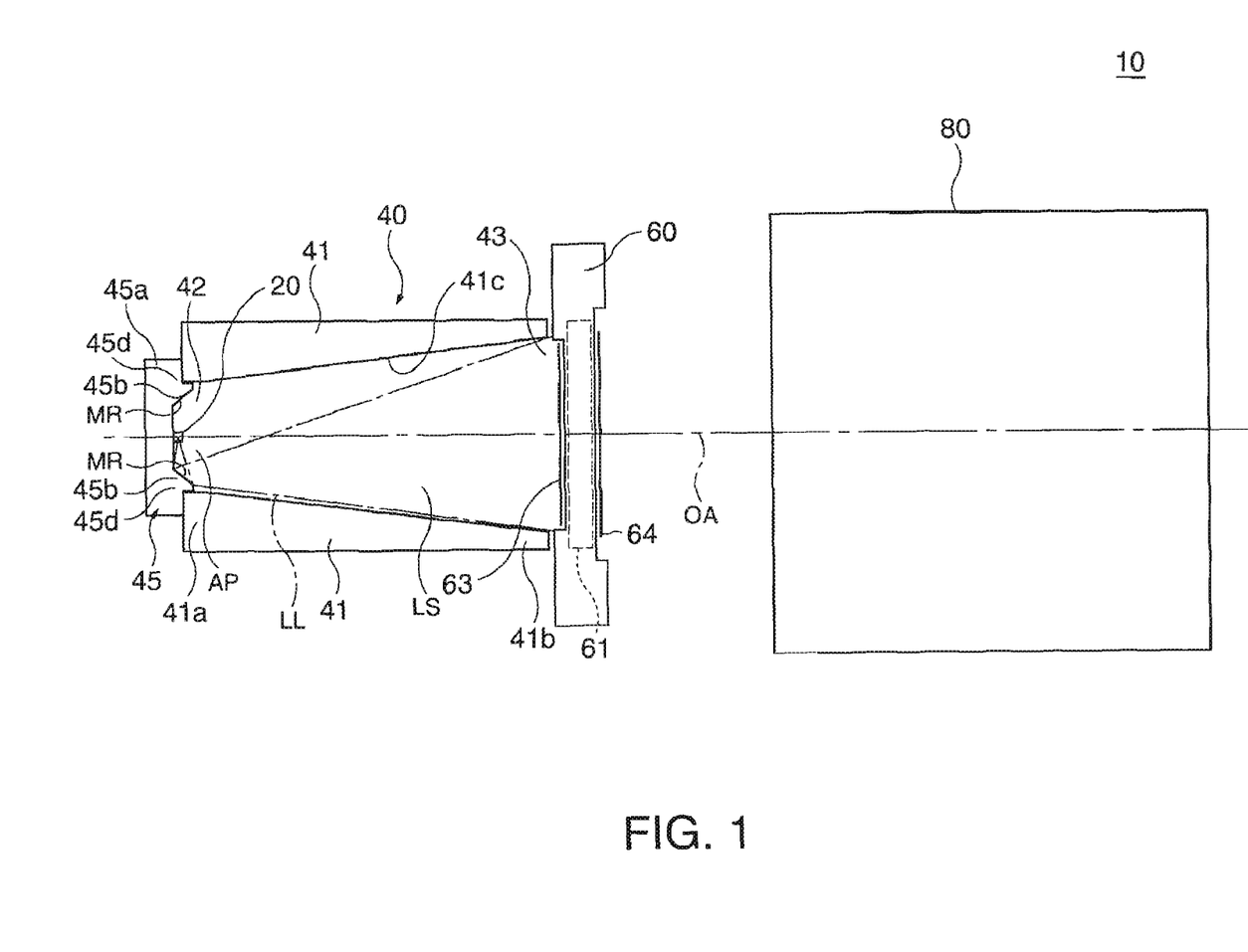
FIG. 1 is a side view conceptually illustrating a projector according to a first embodiment of the invention.
Figure 2:
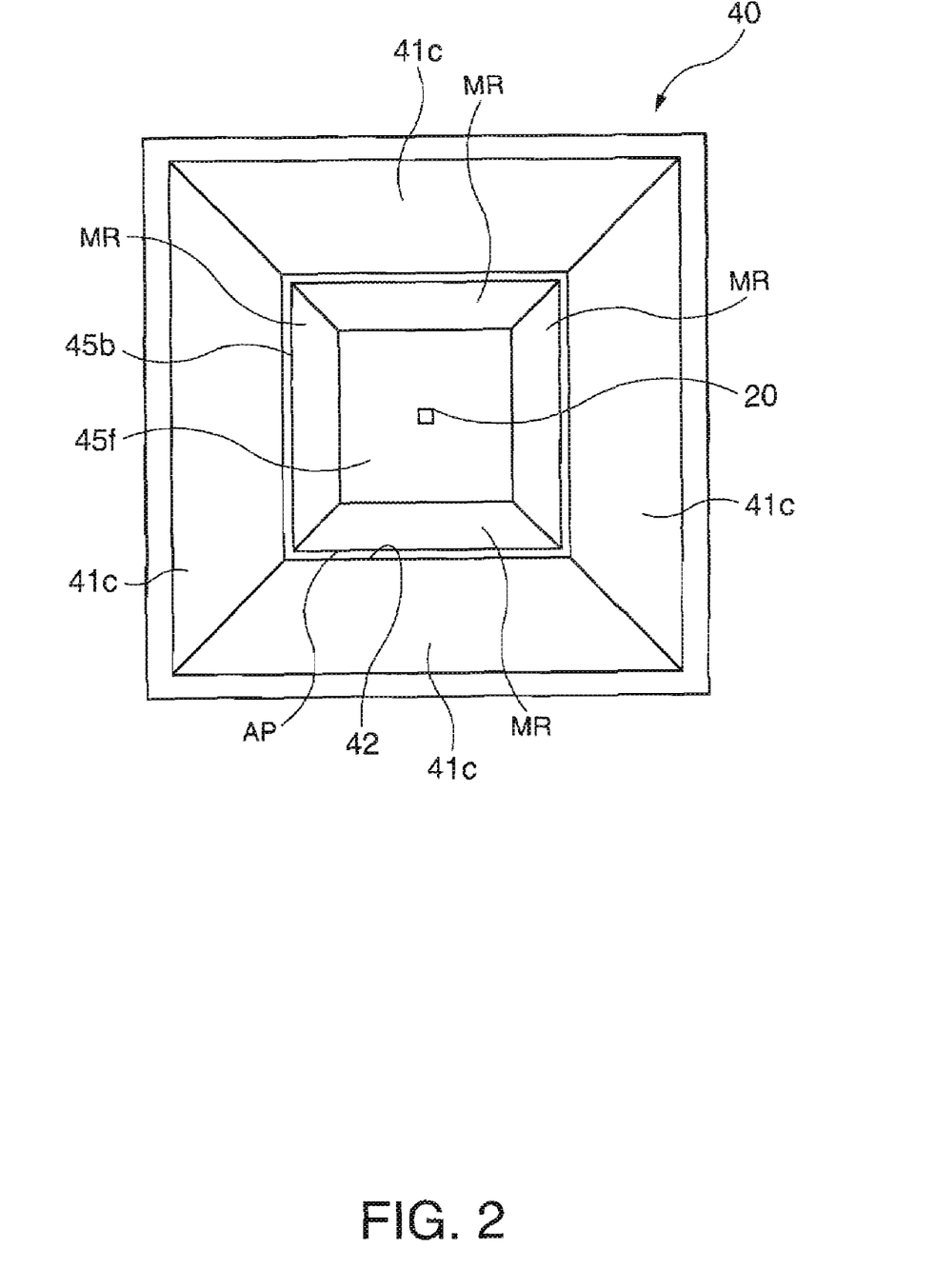
FIG. 2 is an end view showing essential parts of the projector shown in FIG. 1.

FIG. 1 is a side view illustrating a projector that is a display device according to a first embodiment of the invention. FIG. 2 is an end view showing essential parts of the projector shown in FIG. 1.

A projector 10 includes a light source device 20 that generates light-source light, an illumination optical system 40 that collects and uniformizes light-source light to be emitted from the light source device 20, a light modulation unit 60 that is illuminated with illumination light passing through the illumination optical system 40, and a projection lens 80 that projects image light from the light modulation unit 60 onto a screen (not shown). Here, the light source device 20 and the illumination optical system 40 form an illumination device that uniformly illuminates the light modulation device 60.

Figure 3:
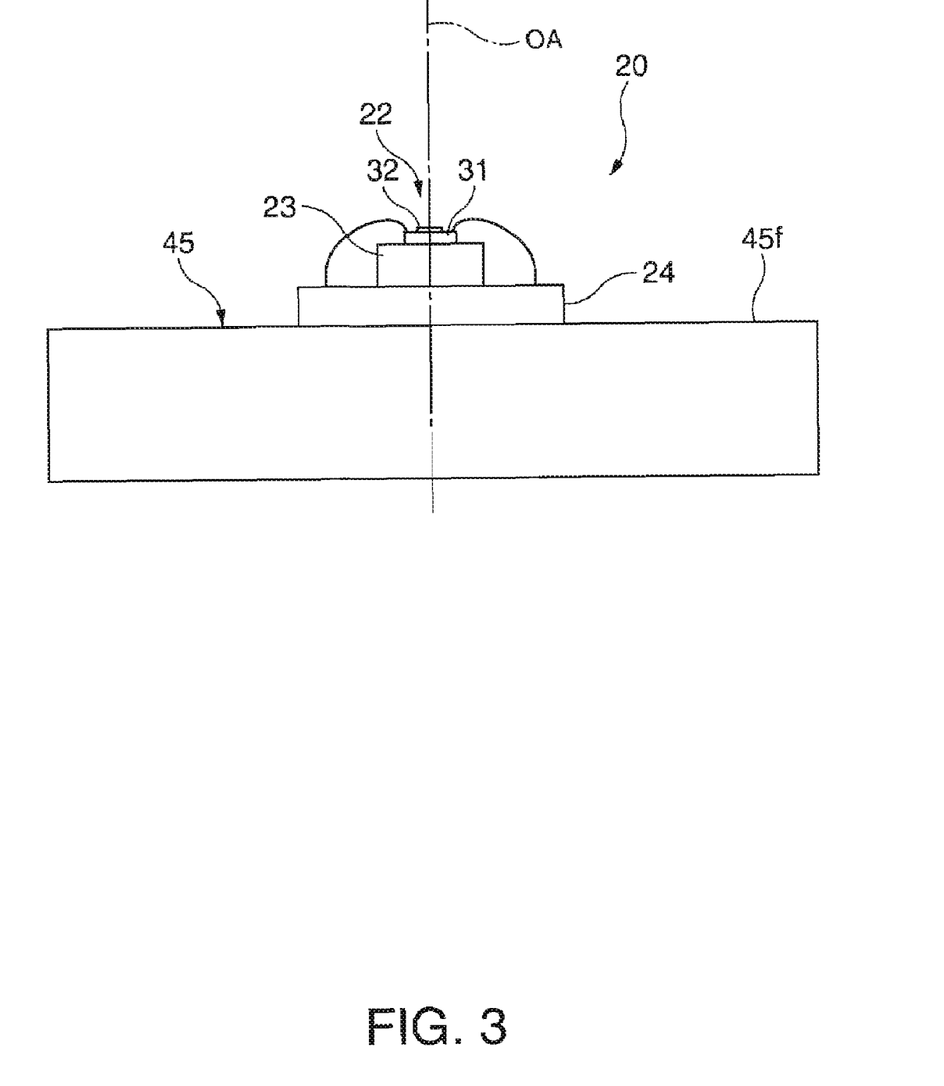
FIG. 3 is an enlarged side view illustrating a sectional structure of a light source device.

In the projector 10, as shown in FIG. 3, the light source device 20 is Formed by mounting a light emitting device 22 generating light-source light having a desired wavelength region on a circuit board 24 having a power line and the like. The light emitting device 22 is a light source package having an internal LED chip 31 as a solid light-emitting element as a light source. The LED chip 31 is mounted on a flat support 23 formed of resin, ceramic or the like. The TED chip 31 has a rectangular light emitting portion 32 at its top surface. When power is supplied from the circuit board 24, light-source light is emitted from the light emitting portion 32. The light emitting portion 32 has one or more light emitting regions that generate one of red, green and blue light components, or a combination of a plurality of Color light components. When the light emitting portion 32 has a plurality of light emitting regions that respectively generates red, yellow, green, and blue light components, light-source light of approximately white is emitted from the light source device 22 as a whole. Further, if a fluorescent layer that generates fluorescent light of a red, yellow, or green light by blue light from the light emitting portion 32 is provided in the vicinity of the light emitting portion 32 including its upper portion, white light or the like may be formed by a monochrome light emitting portion 32. Moreover, most of light-source light to be emitted from the light emitting portion 32 is emitted to the front along an optical axis OA, and a part thereof is emitted to the lateral side perpendicular to the optical axis OA.

The illumination optical system 40 includes a hollow rod integrator 41 that has a quadrangular prism shape, and a pedestal member 45 that is fixed to an incident side of the rod integrator 41. The rod integrator 41 has a cylindrical appearance that symmetric to the optical axis OA, and its thickness gradually decreases from an incident end 41a, to which the pedestal member 45 is fixed, to an emission end 41b, to which the light modulation unit 60 is fixed. That is, a light guide space LS is formed by four inner wall surfaces 41c of the rod integrator 41. A section of the light guide space LS perpendicular to the optical axis OA has a square shape centering on the optical axis OA, and its sectional area gradually increases from the incident end 41a to the emission end 41b. In summary, the light guide space LS of the rod integrator 41 has a beheaded quadrangular pyramid shape, that is, a tapered shape having a wider sectional area at the emission end 41b. The four inner wall surfaces 41c of the rod integrator 41 are reflective surfaces that are coated with a metal, such as aluminum or the like. Accordingly, the inner wall surfaces 41c reflect, among light fluxes incident from a rod incident port 42 as one end of the rod integrator 41, a light flux having a comparatively large angle with respect to the optical axis OA at least one time, and cause reflected light to be emitted from a rod emission port 43 as the other end of the rod integrator 41 to the light modulation unit 60. At this time, as described above, since the light guide space LS is widened from the rod incident port 42 to the rod emission port 43, the light flux having a comparatively large angle with respect to the optical axis OA is converted into a light flux having a comparatively small angle with respect to the optical axis OA. Accordingly, even though a light flux that largely spreads with respect to the optical axis OA, a light flux having a comparatively small spread with respect to the optical axis OA can be emitted from the rod emission port 43.

The pedestal member 45 is formed of a material having high thermal conductivity, such as aluminum or aluminum nitride. The pedestal member 45 includes a plate-shaped main body portion 45a that has a rectangular shape as viewed from the optical axis OA, and an inclined reflecting portion 45b that is a rectangular protrusion as viewed from the optical axis OA. Of them, the inclined reflecting portion 45b is provided to protrude from the main body portion 45a as a pedestal, and is formed integrally with the main body portion 45a. The main body portion 45a that supports the inclined reflecting portion 45b is one size larger than the rod incident port 42 of the rod Integrator 41 and is fixed to the incident end 41a of the rod integrator 41 to close the rod incident port 42. At this time, a step 45d is formed out-side the inclined reflecting portion 45b along the inclined reflecting portion 45b. A concave portion of the step 45d is engaged with an inner protrusion of the incident end 41a of the rod integrator 41. That is, the concave portion of the step 45d and the inner protrusion of the incident end 41a form an engagement unit that fixes the pedestal member 45 to the rod integrator 41. The inclined reflecting portion 45b on the main body portion 45a of the pedestal member 45 is accurately aligned with the rod incident port 42 of the rod integrator 41 and reliably fixed to the rod incident port 42 by an adhesive or the like. As a result, the light source device 20 fixed on the center of a top surface 45f of the main body portion 45a, that is, the light emitting device 22 is aligned with the rod integrator 41 or the rod incident port 42 and fixed to the rod incident port 42.

The inclined reflecting portion 45b is a light recovery member that includes a mirror MR to be inclined inwardly. As can be apparent from FIG. 1 or the like, the mirror MR is disposed close to the light emitting device 22 in the vicinity of a lateral side of the light emitting device 22. Further, the mirror MR is inclined at approximately 45° with respect to the optical axis OA in a state of substantially facing the optical axis OA. Accordingly, light-source light LL emitted to the lateral side of the light emitting device 22 is bent forward along the optical axis OA by the mirror MR then substantially travels along the optical axis OA, and is subsequently emitted from an aperture AP of the inclined reflecting portion 45b. Here, the inclined reflecting portion 45b has a rectangular shape as viewed from the optical axis OA, and the size of the aperture AP is smaller than the size of the rod incident port 42 of the rod integrator 41. Then, the aperture AP of the inclined reflecting portion 45b is disposed inwardly from the rod incident port 42 of the rod integrator 41 as viewed from the front along the optical axis OA, that is, the light modulation unit 60. Accordingly, light-source light LL from the light emitting device 22 reflected by the inclined reflecting portion 45b can enter the rod integrator 41 with no waste.

The light modulation unit 60 includes a liquid crystal panel 61, on which uniformized illumination light from the illumination optical system 40 is incident, and a pair of polarization filters 63 and 64 that are disposed with the liquid crystal panel 61 Interposed therebetween. Here, the liquid crystal panel 61 and the pair of polarization filters 63 and 64 with the liquid crystal panel 61 interposed therebetween form a liquid crystal light valve that performs two-dimensional luminance modulation on illumination light. The liquid crystal panel 61 is a non-luminous and transmissive light modulation device that changes a spatial distribution of a polarization direction of incident illumination light. The polarization state of illumination light incident on the liquid crystal panel 61 is adjusted by pixels according to a driving signal or an image signal input to the liquid crystal panel 61 as an electrical signal. At this time, the polarization direction of illumination light incident on the liquid crystal panel 61 is adjusted by the polarization filters 63 and 64, and modulated light in a predetermined polarization direction is extracted from light to be emitted from the liquid crystal panel 61

When illumination light incident on the light modulation unit 60 from the illumination optical system 40 is red light, yellow light, green light, or blue light, or when illumination light is approximately white light including red, yellow, green, and blue light components, the liquid crystal panel 61 can form image light corresponding to an image by two-dimensionally modulating the color light components. Moreover, when illumination light is approximately whit light, illumination light of approximately white light uniformly incident on the liquid crystal panel 61 can be modulated to a color image by providing color filters in an appropriated arrangement for every pixel of the liquid crystal panel 61.

The projection lens 80 is a projection optical system having an appropriate lens group. The projection lens 80 projects image light passing through the light modulation unit 60 onto the screen (not shown) at appropriate magnification.

In the above-described projector 10 according to the first embodiment, the inclined reflecting portion 45b provided in the pedestal member 45 of the illumination optical system 40 has the mirror MR that is inclined at approximately 45° with respect to the optical axis OA. Accordingly, light-source light LL emitted to the lateral side of the light emitting device 22 can be recovered to the front. Then, recovered light is guided into the rod integrator 41. Therefore, utilization efficiency of light-source light to be emitted from the light emitting device 22 can be increased, and the light modulation unit 60 can be illuminated from the front with small inclined components.

Figure 4A:
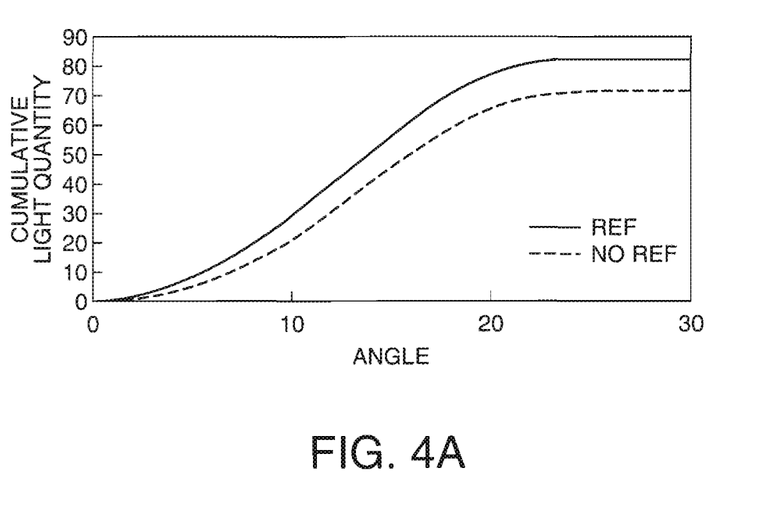
FIGS. 4A and 4B are graphs showing a cumulative light quantity and a luminosity distribution with respect to an angle of a light flux to be emitted from an illumination optical system.
Figure 4B:
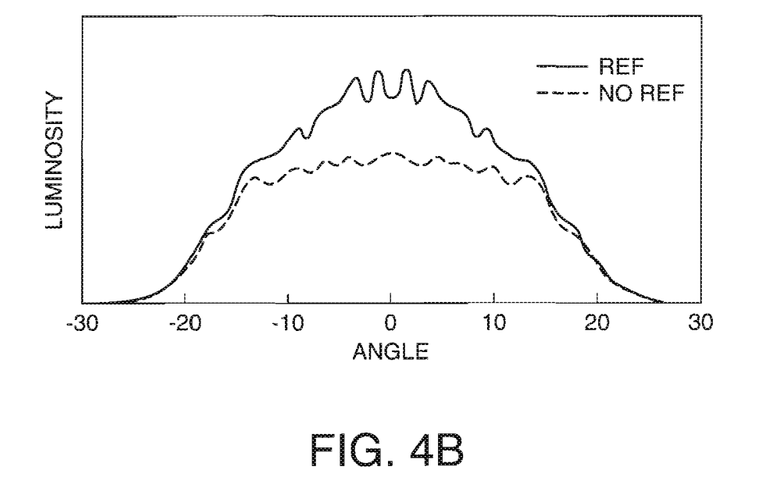

FIG. 4A is a graph showing a cumulative light quantity with respect to an angle of a light flux to be emitted from the illumination optical system 40. FIG. 4B is a graph showing a luminosity distribution with respect to the angle of the light flux to be emitted from the illumination optical system 40. Moreover, in both graphs, a solid line represents a case where the pedestal member 45 provided with the inclined reflecting portion 45b shown FIG. 2 or the like, and a dotted line represents a case where a pedestal member of a comparative example not provided with the inclined reflecting portion 45b shown in FIG. 2 or the like. Table 1 gives numeric values of both graphs.

TABLE 1

| Angle | REF | No REF |
|---|---|---|
| 0 | 0 | 0 |
| 1 | 0.393949 | 0.252178 |
| 2 | 1.47892 | 0.97433 |
| 3 | 3.12974 | 1.92891 |
| 4 | 5.44232 | 3.35954 |
| 5 | 8.28678 | 5.20935 |
| 6 | 11.7218 | 7.57245 |
| 7 | 15.5149 | 10.3549 |
| 8 | 19.5887 | 13.4721 |
| 9 | 24.0298 | 16.975 |
| 10 | 28.8577 | 20.9477 |
| 11 | 33.9844 | 25.309 |
| 12 | 39.1912 | 29.9293 |
| 13 | 44.6092 | 34.8007 |
| 14 | 50.3385 | 40.0491 |
| 15 | 56.0501 | 45.4041 |
| 16 | 61.2986 | 50.4137 |
| 17 | 65.9839 | 54.9059 |
| 18 | 70.2 | 58.9878 |
| 19 | 73.8672 | 62.5146 |
| 20 | 76.7863 | 65.3532 |
| 21 | 78.956 | 67.4725 |
| 22 | 80.3763 | 68.8623 |
| 23 | 81.2964 | 69.7654 |
| 24 | 81.8580 | 70.3218 |
| 25 | 82.033 | 70.4044 |
| 26 | 82.0916 | 70.5553 |
| 27 | 82.0943 | 70.5576 |
| 28 | 82.0943 | 70.5576 |
| 29 | 82.0943 | 70.5576 |
| 30 | 82.0943 | 70.5576 |

As will be apparent from the graphs, it can be seen that light to be emitted to the front along the optical axis OA by the inclined reflecting portion 45b can be increased. Accordingly, in illumination light incident on the light modulation unit 60, a ratio of vertically incident light along the optical axis OA can be increased and the light modulation unit 60 can accurately operate in an ideal state. That is, contrast of an image to be formed by the light modulation unit 60 can be increased, and occurrence of luminance irregularity can be prevented.

In the above-described projector 10 of the first embodiment, the shape of the inclined reflecting portion 45b provided in the pedestal member 45 is not limited to a rectangular shape disposed in the vicinity of the light emitting device 22. For example, the inclined reflecting portion 45b may be disposed in a circular shape in the vicinity of the light emitting device 22. Further, the inclined reflecting portion 45b may be disposed in a polygonal shape, excluding the rectangular shape, in the vicinity of the light emitting device 22.

Further, the mirror MR formed in the inclined reflecting portion 45b may be a curved surface, not a flat surface. In addition, the mirror MR may be formed by a plurality of parts having different inclinations or arrangements In addition, the inclination of the mirror MR with respect to the optical axis OA is not limited to 45° in the drawing. Alternatively, the inclination of the mirror MR with respect to the optical axis OA may be appropriately changed according to an angle of light-source light LL to be emitted to the lateral side from the light emitting device 22 or an angle of light-source light LL to be guided to the rod integrator 41. For example, when light-source light LL to be emitted from the light emitting device 22 has an inclination of 90°−α with respect to the optical axis OA, in order to allow light-source light LL to be substantially reflected along the optical axis OA, the inclination of the mirror MR with respect to the optical axis OA becomes 45°−α/2. An angle at which light-source light LL is reflected by the mirror MR and incident on the rod integrator 41 can be appropriately changed by changing the inclination or arrangement of the mirror MR according to the specification of the rod integrator 41 or the light modulation unit 60.

Second Embodiment

Hereinafter, a projector according to a second embodiment of the invention will be described. The projector of the second embodiment changes the structure of the illumination optical system or the like in the projector of the first embodiment. It is assumed that parts not particularly described herein are the same as those in the first embodiment.

Figure 5:
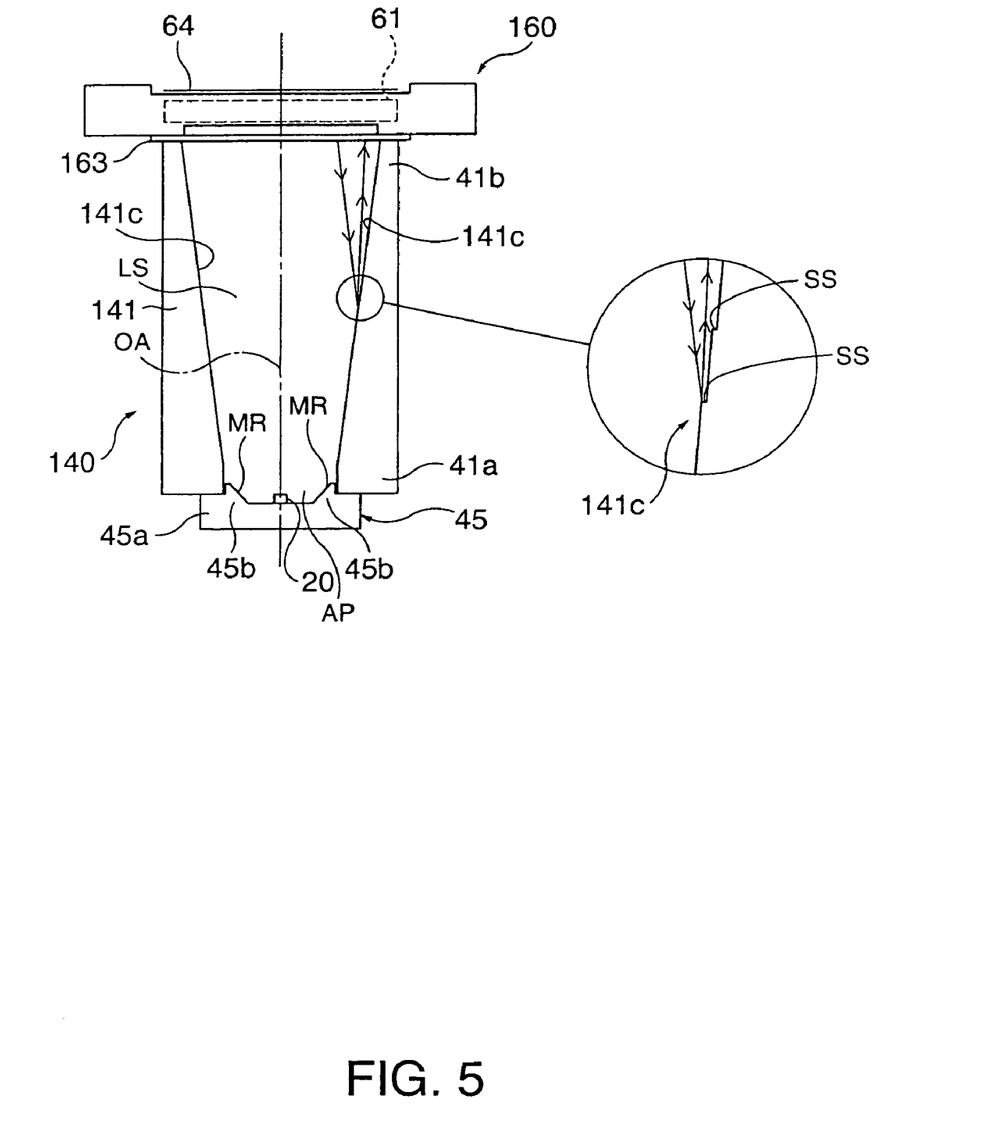
FIG. 5 is a side view illustrating essential parts of a projector according to a second embodiment of the invention.

As shown in FIG. 5, in the projector of this embodiment, an illumination optical system 140 and a light modulation unit 160, are different from those in the first embodiment.

Here, a rod integrator 141 constituting the illumination optical system 140 has tapered inner wall surfaces 141c, like the first embodiment. However, unlike the first embodiment, four inner wall surfaces 141c are processed in step shapes That is, the inner wall surfaces 141c has a plurality of minute step portions SS toward the emission end 41b. With the step portions SS, return light reflected by the light modulation unit 160 can be reflected to the front. Accordingly, illumination light cannot be wasted so much, and the light modulation unit 160 can be efficiently illuminated.

The light modulation unit 160 includes a liquid crystal panel 61 and polarization filters 163 and 64, like the first embodiment. However, the incident-side polarization filter 163 is a wire grid polarization element. The wire grid polarization element is a polarization separating element that transmits only polarized light in a specific direction and reflects polarized light orthogonal to the specific direction using a conductor pattern of a minute stripe shape. Accordingly, illumination light incident on the liquid crystal panel 61 can be arranged with only polarized light in the specific direction, and polarized light in the orthogonal direction not used as illumination light can be prevented from being absorbed in the polarization filter 163. Further, durability of the polarization filter 163 against illumination light can be increased. Reflected light from the polarization filter 163 has a high possibility of being recycled by the step portions SS provided at the inner wall surfaces 141c of the rod integrator 141. Moreover, the polarization filter 163 is not limited to the wire grid polarization element. For example, the polarization filter 163 can be substituted with other polarization separating elements (for example, a polarization beam splitter or a combination of a polarization beam splitter and a retardation film).

In this embodiment, the polarization filter 163 is fixed to the emission end 41b of the rod integrator 141. That is, the illumination optical system 140 and the polarization filter 163 are integrated through the thin polarization filter 163. Therefore, a compact projector can be obtained.

In the above-described projector of this embodiment, the inclined reflecting portion 45b provided in the pedestal member 45 of the illumination optical system 140 has the mirror MR that is inclined at approximately 45° with respect to the optical axis. Accordingly, light-source light emitted to the lateral side of the light emitting device 22 can be recovered to the front. In addition, as described above, return light from the polarization filter 163 is reflected by the step portions SS provided in the rod integrator 141 and returns to the front again, such that at least a part of return light is recovered. Then, recovered light is guided into the light modulation unit 160. Therefore, utilization efficiency of light-source light can be increased, and the light modulation unit 160 can be illuminated from the front with small inclined components.

Third Embodiment

Hereinafter, a projector according to a third embodiment of the invention will be described. The projector of the third embodiment changes the structure of the light source device or the like in the projector of the first or second embodiment. It is assumed that parts not particularly described herein are the same as those in the first embodiment.

Figure 6:
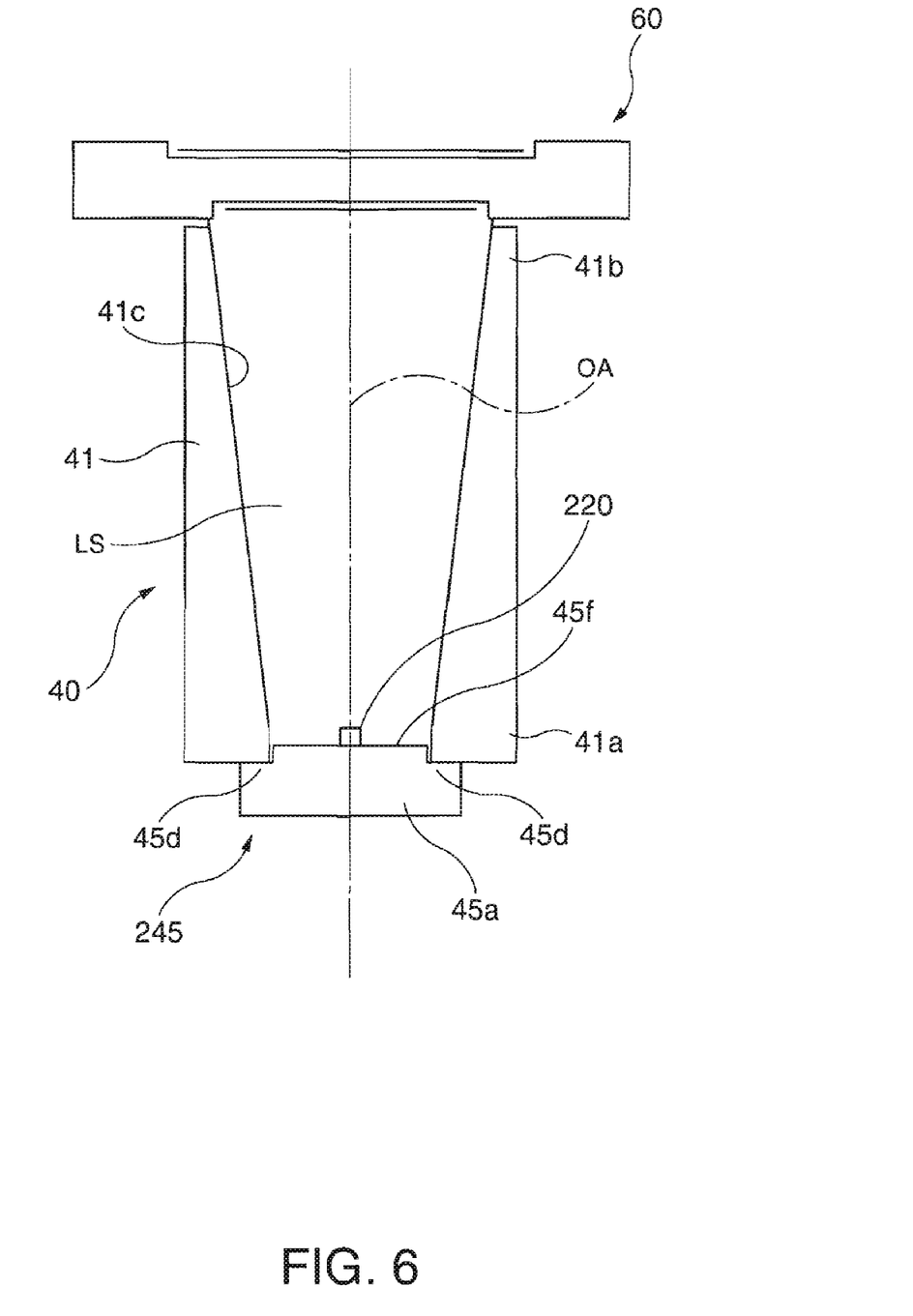
FIG. 6 is a side view illustrating a projector according to a third embodiment of the invention.
Figure 7:
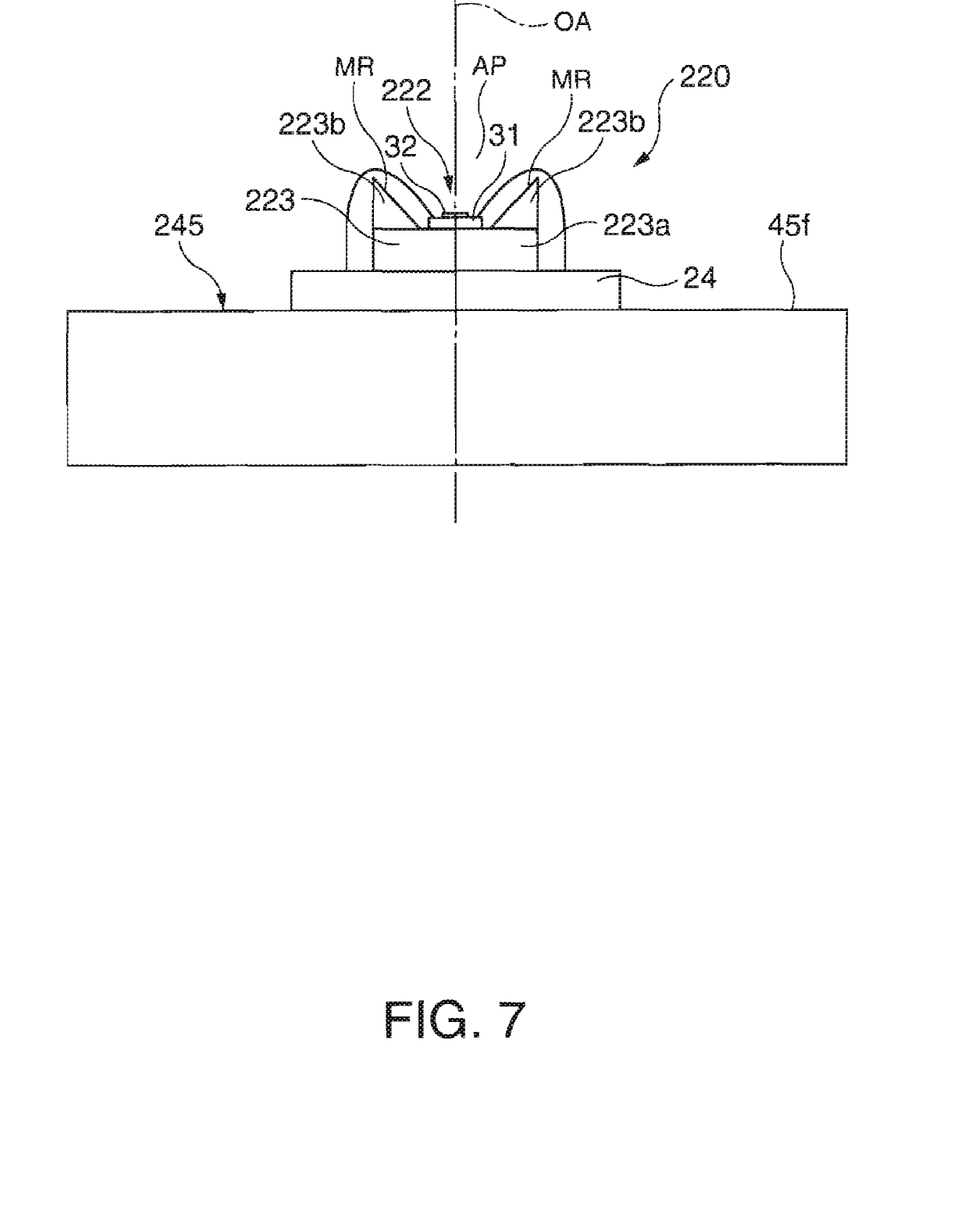
FIG. 7 is a side view illustrating a light source of the projector according to the third embodiment of the invention.

FIG. 6 is a side view showing essential parts of the protector of this embodiment. FIG. 7 is a side view of a light source device. As will be apparent from FIG. 6, the light source device 220 is fixed to a flat top surface 45f of a pedestal member 245. That is, in this embodiment, the pedestal member 245 has a main body portion 45a, not having the inclined reflecting portion 45b shown in FIG. 1. Meanwhile, as shown in FIG. 7, the light emitting device 220 supported by the pedestal member 45 includes a light emitting device 222 as a light source package, and a circuit board 24 that supports the light emitting device 222. Here, the light emitting device 222 has an LED chip 31 as a light source, and a support 223 that mounts the LED chip 31 thereon. The support 23 includes a main body portion 223a and an inclined reflecting portion 223b. The inclined reflecting portion 223b is provided in an upper portion of the main body portion 223a and formed integrally with the main body portion 223a The inclined reflecting portion 223b is a rectangular or circular protrusion as viewed from the optical axis OA and forms a light recovery member including a mirror MR inwardly inclined. The mirror MR is disposed close to the LED chip 31 in the vicinity of the lateral side of the LED chip 31. The mirror MR is inclined, for example, at 45° with respect to the optical axis OA in a state of substantially facing the optical axis OA. Accordingly, light-source light emitted to the lateral side of the LED chip 31 is bent to the front of the optical axis OA by the mirror MR, then substantially travels along the optical axis OA, and is subsequently emitted from an aperture AP of the inclined reflecting portion 223b. Here, the size of the aperture AP of the inclined reflecting portion 223b is sufficiently smaller than the size of the rod incident port 42 of the rod integrator 41. The aperture AP of the inclined reflecting portion 223b is disposed close to the center of the rod incident port 42 of the rod integrator 41. Accordingly, light-source light from the LED chip 31 reflected by the inclined reflecting portion 223b can enter the rod integrator 41 with no waste.

Moreover, a concave portion surrounded by the inclined reflecting portion 223b at the upper portion of the main body portion 223a may be filled with resin or the like.

Fourth Embodiment

Hereinafter, a projector according to a fourth embodiment of the invention will be described. The projector of the fourth embodiment changes the projector of the first to third embodiments. It is assumed that parts not particularly described herein are the same as those in the first embodiment or the like.

Figure 8A:
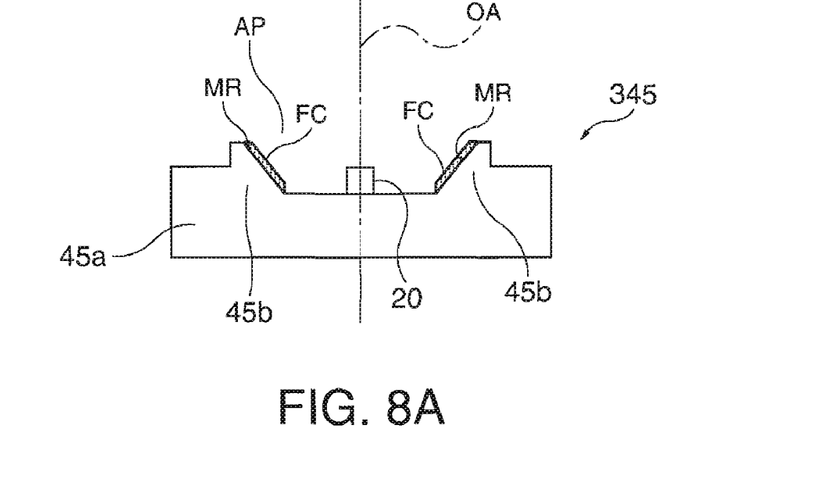
FIGS. 8A and 8B are side views illustrating a fourth embodiment of the invention that is modifications of the first and third embodiments.
Figure 8B:
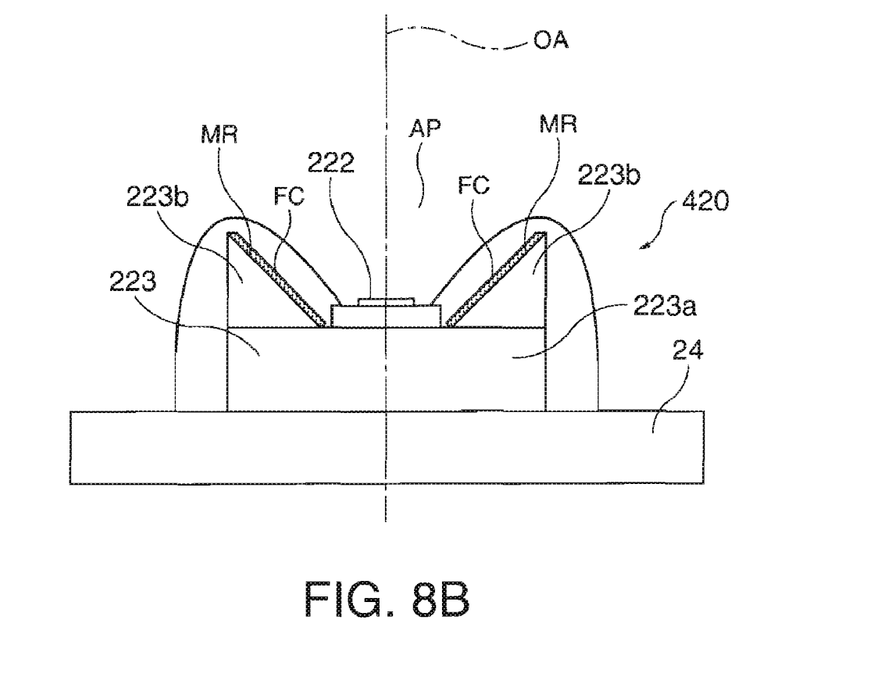

FIG. 8A shows a modification of the projector of the first embodiment. FIG. 8B shows a modification of the projector of the third embodiment.

A pedestal member 345 shown in FIG. 8A has a structure in which a fluorescent layer FC is coated on the entire surface of the mirror MR provided in the inclined reflecting portion 45b. Accordingly, light-source light emitted to the lateral side of the light source device 20 can be bent to the front of the optical axis OA and emitted from the aperture AP of the inclined reflecting portion 45b, and a fluorescent conversion can be performed on reflected light. For example, it is assumed that, when the light source device 20 generate blue light, the fluorescent layer FC may generate at least one of red, yellow, and green light components, or fluorescent light as a combination of the light components using blue light. In this case, the red, yellow, or green light component can be generated from blue light to be emitted from the light source device 20, and the red, yellow, and green light components can be guided to the front of the light source device 20, that is, into the rod integrator 41, in addition to blue lights Further, it is assumed that, when the light source device 20 generates purple light, the fluorescent layer FC generates at least one of the red, yellow, green, or blue light component, or fluorescent light as a combination of the color components using purple light. In this case, the red, yellow, green, or blue light component can be generated from purple light to be emitted from the light source device 20, and the red, yellow, green, and blue light components can be guided to the front of the light source device 20, that is, into the rod integrator 41. Moreover, whether to cause the fluorescent layer FC to emit one of the red, yellow, green, and blue can be adjusted by a fluorescent material to be included in the fluorescent layer FC. In the above structure, the mirror MR is provided in the inclined reflecting portion 45b, but the mirror MR may not be provided. In this case, when a light flux from the light source device 20 is not sufficiently subject to wavelength conversion by a fluorescent substance, a light flux having an original wavelength is not bent to the front of the optical axis OA and not emitted from the aperture AP.

In a light emitting device 222 provided in a light source device 420 shown in FIG. 8B, a fluorescent layer FC is coated on the entire surface of a mirror MR provided in an inclined reflecting portion 223b of the support 23. Accordingly, light-source light emitted to the lateral side of the light emitting device 222 can be bent to the front of the optical axis OA and emitted from the aperture AP of the inclined reflecting portion 223b, and a fluorescent conversion can be performed on reflected light For example, it is assumed that, when the light emitting device 222 generates blue light, the fluorescent layer FC generates at least one of red, yellow, and green light components or fluorescent light as a combination of the light components using blue light. Further, it is assumed that, when the light emitting device 222 generates purple light, the fluorescent layer FC generates at least one of red, yellow, green, and blue light components or fluorescent light as a combination of the light components using purple light. Moreover, whether to cause the fluorescent layer PC to emit one of the red, yellow, green, and blue light components can be adjusted by a fluorescent material to be included in the fluorescent layer FC. In the above description, the mirror MR is provided in the inclined reflecting portion 223b, but the mirror MR may not be provided. In this case, when a light flux from the light emitting device 222 is not sufficiently subject to the waveform conversion by a fluorescent substance, a light flux having an original wavelength is not bent to the front of the optical axis OA and not emitted from the aperture AP.

Fifth Embodiment

Hereinafter, a projector according to a fifth embodiment of the invention will be described. The projector of the fifth embodiment changes the projector of the second embodiment. It is assumed that parts not particularly described herein are the same as those in the second embodiment or the like.

Figure 9A:
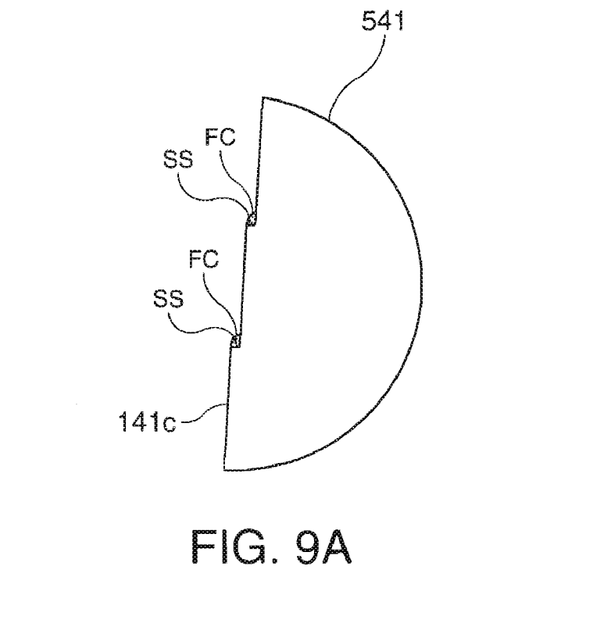
FIGS. 9A and 9B are side views illustrating a fifth embodiment of the invention.
Figure 9B:
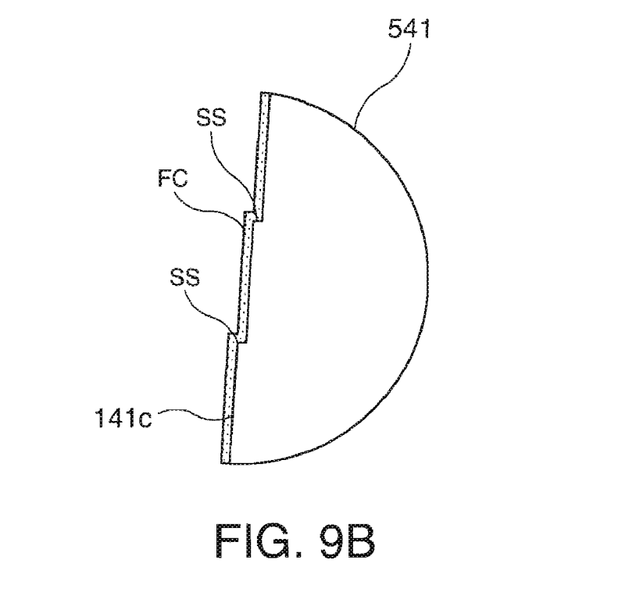

FIG. 9A is a partially enlarged cross-sectional view showing essential parts of a projector according to a first example of this embodiment. FIG. 9B is a partially enlarged cross-sectional view showing essential parts of a projector according to a second example.

In FIG. 9A, inner wall surfaces 141c of a rod integrator 541 have a structure in which a fluorescent layer C is coated on step portions SS. Accordingly, return light reflected by the light modulation unit 160 shown in FIG. 5 can be reflected to the front, and a fluorescent conversion can be performed on return light. That is, it is assumed that, when the light source device 20 shown in FIG. 5 generates blue light, the fluorescent layer FC generates at least one of red, yellow, and green light components or fluorescent light as a combination of the light components using blue return light. Further, it is assumed that, when the light source device 20 shown in FIG. 5 generates purple light, the fluorescent layer FC generates at least one of red, yellow, green, and blue light components or fluorescent light as a combination of the light components using purple light. In the above description, the surfaces of the step portions SS form a mirror, but a mirror may not be provided.

In FIG. 9B, the inner wall surfaces 141c of the rod integrator 541 have a structure in which a fluorescent layer FC is coated on the entire inner wall surfaces 141c as well as the step portions SS. Accordingly, the fluorescent conversion can be performed when return light from the light modulation unit 160 shown in FIG. 5 is reflected to the front. Further, the fluorescent conversion can be performed on a light flux to be reflected by the inner wall surfaces 141c while passing through the rod integrator 541.

Sixth Embodiment

Hereinafter, a projector according to a sixth embodiment of the invention will be described. The projector of the sixth embodiment changes the protector of the first embodiment to a so-called three-plate type. It is assumed that parts not particularly described herein are the same as those in the first embodiment. Moreover, the following description is just for illustrative. The projector of the second, third embodiment or the like can be changed to the three-plate type.

Figure 10:
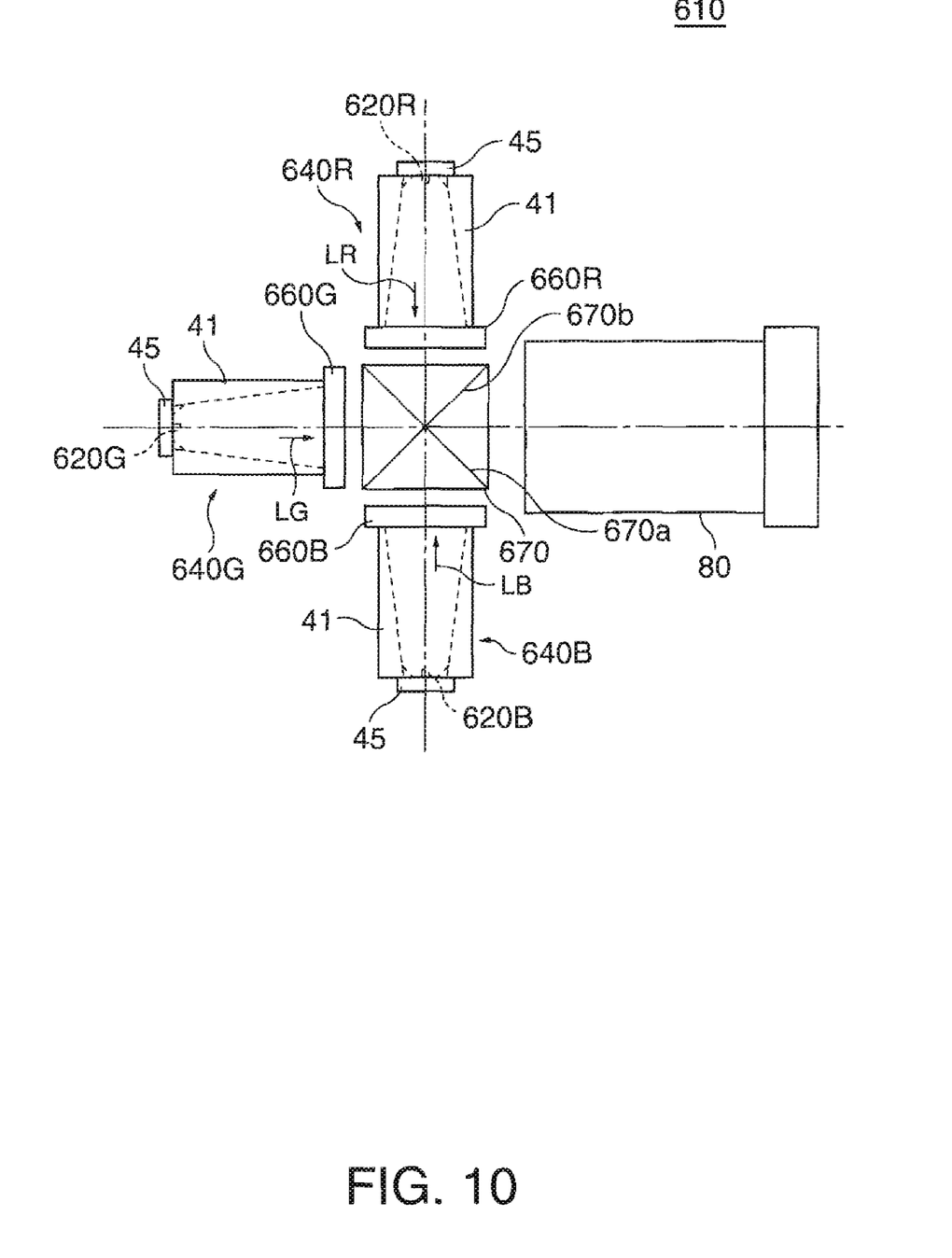
FIG. 10 is a diagram conceptually illustrating a projector according to a sixth embodiment of the invention.

FIG. 10 is a diagram illustrating a projector according to the sixth embodiment. A projector: 610 includes three light source devices 620R, 620G, and 620B that generate light-source light of respective colors, three illumination optical systems 640R, 640G, and 640B that separately collect and uniformize light-source light emitted from the respective light source devices 620R, 620G, and 620B, three light modulation units 660R, 660G, and 660B that are illuminated with illumination light LR, LG, and LB passing through the respective illumination optical systems 640R, 640G, and 640B, a cross dichroic prism 670 that synthesizes modulated light to be emitted from the respective light modulation units 660R, 660G, and 660B, and a projection lens 80 that projects image light passing through the cross dichroic prism 670 onto a screen (not shown).

Each of the light source devices 620R, 620G, and 620B has the same structure and shape as the light source device 20 of the first embodiment shown in FIG. 1. However, the light source devices 620R, 620G, and 620B have different colors to be emitted from respective internal LED chips 31, that is, red, green, and blue.

Each of the illumination optical systems 640R, 640G, and 640B has the rod integrator 41 and the pedestal member 45, like the illumination optical system 40 of the first embodiment shown in FIG. 1. The illumination optical systems 640R, 640G, and 640B respectively collects light-source light to be emitted from the light source devices 620R, 620G, and 620B and causes light-source light to be respectively incident on the light modulation units 660R, 660G, and 660B as illumination light LR, LG, and LB.

Each of the light modulation units 660R, 660G, and 660B has the same structure and shape as the light modulation unit 60 of the first embodiment shown in FIG. 1. Each of the light modulation units 660R, 660G, and 660B includes a liquid crystal panel for each color (not shown) and polarization filters with the liquid crystal panel interposed therebetween.

The cross dichroic prism 670 is a color synthesis optical system. The cross dichroic prism 670 includes, on a plane, a first dichroic film (specifically, a dielectric multilayer film) 670a for red light reflection and a second dichroic film (specifically, a dielectric multilayer film) 670b for blue light reflection. The first dichroic film 670a and the second dichroic film 670b cross each other in an X shape. The cross dichroic prism 670 reflects modulated red light from the light modulation unit 660R by the first dichroic film 670a to be emitted to a left side of a travel direction, and allows modulated green light from the light modulation unit 660G to go straight and is emitted through both dichroic films 670a and 670b. Further, the cross dichroic prism 670 reflects modulated blue light from the light modulation unit 660B by the second dichroic film 670b to be emitted to a right side of the travel direction In such a manner, image light synthesized by the cross dichroic prism 670 is projected on the screen (not shown) as a color image at appropriate magnification through the projection lens 80 as a projection optical system.

Although the invention has been described by way of the embodiments, the invention is not limited to the above embodiments. Various modifications can be made within the scope without departing from the subject matter of the invention. For example, the following modification can be made.

In the above embodiments, light-source light emitted to the lateral side from the LED chip 31 guided to the rod integrator 41 or the like through the mirror MR. Alternatively, light-source light emitted to the lateral side from an EL element or the like may be guided to the rod integrator 41 or the like through the mirror MR.

Further, the projectors include a front projector that projects an image from an observation direction of a projection surface, and a rear projector that projects an image from a side opposite to the observation direction of the projection surface, but the configuration of the projector 10 or 610 shown in FIG. 1 or the like can be applied to any projector.

The entire disclosure of Japanese Patent Application No. 2006-084942, filed March 27, is expressly incorporated by reference herein.

What is claimed is:

1. An illumination device comprising:
   a light source that emits light-source light;
   a light recovery member that is disposed close to the light source in the vicinity of a lateral side of the light source, and has a light receiving surface inclined at a predetermined angle with respect to an optical axis extending from the light source, to face the optical axis;

a rod integrator that uniformizes light-source light from the light source and light-source light reflected by the light recovery member; and a polarization separating element that is disposed at a rod emission port of the rod integrator;

the rod integrator having a plurality of step portions along the length of the rod integrator, the step portions reflecting light that is reflected off of the polarization separating element directly back towards the rod emission port of the rod integrator.

2. The illumination device according to claim 1, wherein the light receiving surface of the light recovery member is a mirror that reflects light-source light emitted from the light source.

3. The illumination device according to claim 2, wherein the mirror of the light recovery member is inclined at approximately 45° with respect to the optical axis.

4. The illumination device according to claim 1, wherein the light source and the light recovery member are integrated to form a light source package.

5. The illumination device according to claim 1, wherein the light recovery member is disposed in the vicinity of a light source package including the light source.

6. The illumination device according to claim 5, wherein the light recovery member is fixed on a pedestal that supports the light source package.

7. The illumination device according to claim 6, wherein the pedestal and the light recovery member are integrated to form a pedestal member.

8. The illumination device according to claim 1, wherein the light recovery member has a fluorescent substance having photosensitivity to light-source light on the light receiving surface or in the vicinity of the light receiving surface.

9. The illumination device according to claim 1, wherein a fluorescent substance provided in the light recovery member has a light-emission characteristic of at least one of yellow, green, and red light components relative to incident blue light.

10. The illumination device according to claim 1, wherein the light recovery member causes a light flux to be emitted by reflection from the light recovery member to be incident on the rod integrator through a rod incident port, and causes the light flux to be directly emitted from the rod emission port of the rod integrator without being reflected in the rod integrator.

11. The illumination device according to claim 1, wherein an aperture, through which a light flux is emitted from the light recovery member, is smaller than a rod incident port of the rod integrator.

12. The illumination device according to claim 11, wherein the aperture of the light recovery member is disposed inwardly from the rod incident port of the rod integrator.

13. The illumination device according to claim 12, further comprising:

an engagement unit that fixes the aperture of the light recovery member to the rod incident port of the rod integrator.

14. The illumination device according to claim 1, wherein the polarization separating element is fixed to the rod emission port of the rod integrator.

15. The illumination device according to claim 1, wherein the polarization separating element is a wire grid polarization element.

16. The illumination device according to claim 1, wherein the step portions have a fluorescent substance having photosensitivity to light-source light.

17. A projector comprising:

the illumination device according to claim 1;

a light modulation device that modulates illumination light from the illumination device according to image information; and a projection optical system that projects image light formed by the light modulation device.

18. The illumination device according to claim 1, wherein the step portions are substantially perpendicular to the side of the rod integrator.

* * * * *